(12) United States Patent
Kang (10) Patent No.: US 12,507,199 B2
(45) Date of Patent: Dec. 23, 2025

(54) SYSTEM FOR PROVIDING PRECISE POSITION INFORMATION ON BASIS OF MACHINE LEARNING, AND PROVISION METHOD THEREFOR

(71) Applicant: Seung-hoon Kang, Seoul (KR)

(72) Inventor: Seung-hoon Kang, Seoul (KR)

( * ) Notice: Subject to any disclaimer, the term of this patent is extended or adjusted under 35 U.S.C. 154(b) by 319 days.

(21) Appl. No.: 18/346,888

(22) Filed: Jul. 5, 2023

(65) Prior Publication Data

US 2023/0354259 A1  Nov. 2, 2023

Related U.S. Application Data

(63) Continuation-in-part of application No. PCT/KR2021/000415, filed on Jan. 12, 2021.

(30) Foreign Application Priority Data

Jan. 8, 2021 (KR) .......................... 10-2021-0002381

(51) Int. Cl.
| | |
|---|---|
| *H04W 64/00* | (2009.01) |
| *G01S 19/07* | (2010.01) |
| *G06N 20/00* | (2019.01) |
| *G06T 7/70* | (2017.01) |

(52) U.S. Cl.
CPC ............ *H04W 64/003* (2013.01); *G01S 19/07* (2013.01); *G06N 20/00* (2019.01); *G06T 7/70* (2017.01)

(58) Field of Classification Search
CPC ........ H04W 64/003; G01S 19/07; G01S 5/16; G01S 19/485; G06N 20/00; G06T 7/70
See application file for complete search history.

(56) References Cited

U.S. PATENT DOCUMENTS

| | | | |
|---|---|---|---|
| 9,020,832 B2* | 4/2015 | Fisher ..................... | G06F 16/78 |
| | | | 705/14.1 |
| 2017/0116498 A1* | 4/2017 | Raveane .............. | G06V 10/454 |
| 2019/0090095 A1* | 3/2019 | Lim ......................... | G06T 7/70 |
| 2020/0050894 A1* | 2/2020 | Park ........................ | H04W 4/40 |

FOREIGN PATENT DOCUMENTS

| | | | | |
|---|---|---|---|---|
| KR | 100596629 B1 | 7/2006 | | |
| KR | 1020130136207 A | 12/2013 | | |
| KR | 1020130137065 A | 12/2013 | | |
| KR | 1020190107627 A | 9/2019 | | |
| KR | 102033075 B1 | 10/2019 | | |
| KR | 1020200036665 A | 4/2020 | | |
| WO | WO-2020071573 A1 * | 4/2020 | .............. | G06N 3/08 |

* cited by examiner

*Primary Examiner* — Dhaval V Patel (57) ABSTRACT

The present invention relates to a system for providing precise position information on the basis of machine learning, and a provision method therefor, and, more specifically, to a system for providing precise position information on the basis of machine learning, comprising: an information provision unit, which performs machine-learning-based learning for precise position determination, receives position-related information from a user to analyze the position-related information, and thus determines a precise position, and provides the determined precise position information; and a user terminal unit, which receives the precise position information by using a pre-installed application, inputs position-related information about a desired position through the application and receives precise position information related to the inputted position-related information.

5 Claims, 3 Drawing Sheets

SYSTEM FOR PROVIDING PRECISE POSITION INFORMATION ON BASIS OF MACHINE LEARNING, AND PROVISION METHOD THEREFOR

TECHNICAL FIELD

The present invention relates to a system and method for providing precise position information on the basis of machine learning, which can perform machine learning on the items including facility information, environment information, and the like with comparatively little change, and provide precise position information corresponding to the current position of a user using the same.

BACKGROUND ART

A Global Positioning System (GPS) commonly used to grasp position information is a satellite navigation system that receives signals transmitted from GPS satellites and calculates current position information of a user.

About 30 GPS satellites are located around the earth, and since 24 satellites among them are distributed on 6 orbital planes revolving around the earth, at least 6 GPS satellites can be observed anywhere in the world.

The GPS like this obtains coordinate values by calculating the distance between a GPS satellite and a GPS receiver, specifically, the coordinate values are calculated on the basis of the arrival time of radio waves transmitted from the satellite. However, since the clock mounted on the satellite and the clock mounted on the receiver do not match, errors may occur. Therefore, comparatively precise positions can be calculated only when signals are received from at least four or more GPS satellites. However, there may be a situation unable to receive the signals according to the situation of the receiver located on the ground, and there is a problem in that although the receiver moves to a desired position using the GPS, it actually moves to a position far from the desired position due to the error.

Accordingly, systems that compliments the GPS to be capable of providing more precise position information are developed recently.

In this regard, Korean Patent Registration No. 10-0596629 ("Method for correcting GPS position information by weighting reference points") discloses a method of correcting coordinate values of a survey point more precisely by calculating error values similar to the error of the coordinates obtained at a survey point.

DESCRIPTION

Object of the Invention

Therefore, the present invention has been made in view of the above problems, and it is an object of the present invention to provide a system and method for providing precise position information on the basis of machine learning, which can perform machine learning on the items including facility information, environment information, and the like with comparatively little change, and provide precise position information corresponding to the current position of a user using the same.

SUMMARY OF THE INVENTION

A system for providing precise position information on the basis of machine learning according to an embodiment of the present invention preferably comprises: an information providing unit 100 for performing learning on the basis of machine learning to determine a precise position, receiving position-related information from a user, analyzing the position-related information and determining a precise position, and providing the determined precise position information; and a user terminal unit 200 for receiving the precise position information using a previously installed application, inputting position-related information of a desired position through the application, and receiving precise position information corresponding to the position-related information.

Furthermore, the information providing unit 100 preferably further includes: a learning processing unit 1001 for collecting a plurality of position-related data, generating the plurality of collected position-related data as learning data for machine learning, and performing learning on the generated learning data; and a result processing unit 1002 for receiving, storing, and managing precise position information using the position-related information input from the user using a learning model according to a result of the learning performed by the learning processing unit 1001.

Furthermore, the learning processing unit 1001 preferably analyzes the plurality of collected position-related data, classifies at least one or more items among text information, mark information, landmark information, and environment information included therein, and generates the learning data by matching the classified items to the GPS information.

Furthermore, the result processing unit 1002 preferably configures the precise position information to include GPS information matching a classified item included in the position-related information.

Furthermore, the information providing unit 100 preferably further includes a difference determination unit 1003 for determining a distance difference value of a distance from the precise position information on the basis of the position-related information by comparing the precise position information stored and managed by the result processing unit 1002 with the position-related information input from the user terminal unit 200.

Furthermore, the user terminal unit 200 is configured to include a GPS, and when the user input current GPS information of a desired position through the application, the user terminal unit 200 preferably transmits the input current GPS information as the position-related information to the information providing unit 100, and receives precise position information or a distance difference value corresponding to the position-related information.

Furthermore, the user terminal unit 200 is configured to include a camera, and when the user inputs surrounding picture data captured in real time using the camera at a desired position through the application, the user terminal unit 200 preferably transmits the input surrounding picture data to the information provider 100 as the position-related information, and receives precise position information or a distance difference value corresponding to the position-related information.

Furthermore, the user terminal unit 200 is configured to include a GPS, and when the user inputs current GPS information of a desired position together with the surrounding picture data through the application, the user terminal unit 200 preferably transmits the input surrounding picture data and current GPS information to the information providing unit 100 as the position-related information, and receives precise position information or a distance difference value corresponding to the position-related information.

A method of providing precise position information on the basis of machine learning according to an embodiment of the present invention preferably comprises: a data collection step (S100) of collecting a plurality of position-related data from the outside, by an information providing unit; a data analysis step (S200) of classifying preset items included in the position-related data collected at the data collection step (S100), by the information providing unit; a learning data generation step (S300) of generating learning data for machine learning by matching the classified items analyzed at the data analysis step (S200) to the GPS information, by the information providing unit; a learning processing step (S400) of performing learning on the learning data generated at the learning data generating step (S300), by the information providing unit; a position input step (S500) of inputting position-related information using a previously installed application, by the user terminal; and a precise position providing step (S600) of generating precise position information corresponding to the position-related information by applying the position-related information input at the position input step (S500) to the learning model according to a result of learning at the learning processing step (S400), and providing the precise position information through an application of a user terminal unit.

Furthermore, at the data analysis step (S200), it is preferable to analyze the plurality of collected position-related data, and classify at least one or more items among text information, mark information, landmark information, and environment information included therein.

Furthermore, at the precise position providing step (S600), it is preferable to determine and provide a distance difference value of a distance from the precise position information on the basis of the position-related information input at the position input step (S500), together with the generated precise position information.

Furthermore, at the position input step (S500), it is preferable to input current GPS information of a desired position through the application or input surrounding picture data captured in real time using a camera.

Advantageous Effects

The system and method for providing precise position information on the basis of machine learning of the present invention according to the configuration described above has an advantage of providing more precise position information by performing learning after analyzing various position-related data, prior to learning using a machine learning algorithm, and detecting objects corresponding to mark information including character information of buildings and the like, landmark information such as buildings, mountains, and the like of characteristic shapes, and environmental information such as rivers, lakes, forests, and the like included in the various position-related data, in other words, after generating learning data by classifying various items with comparatively little change and matching the items to the GPS information.

Particularly, the system and method for providing precise position information on the basis of machine learning of the present invention has an advantage of precisely determining current position information using surrounding location information (surrounding picture data or the like), rather than simply determining precise position information using only GPS information.

BEST MODE FOR CARRYING OUT THE INVENTION

Hereinafter, a system and method for providing precise position information on the basis of machine learning of the present invention will be described in detail with reference to the accompanying drawings. The drawings introduced below are provided as an example to sufficiently convey the spirit of the present invention to those skilled in the art. Accordingly, the present invention may be embodied in other forms without being limited to the drawings presented below. In addition, like reference numerals denote like elements throughout the specification.

At this point, unless otherwise defined, the technical terms and scientific terms used herein have meanings commonly understood by those skilled in the art, and descriptions of well-known functions and configurations that may unnecessarily obscure the subject matters of the present invention will be omitted in the following description and accompanying drawings.

In addition, the system means a set of components including devices, mechanisms, and means that are organized and regularly interact to perform necessary functions.

A system and method for providing precise position information on the basis of machine learning according to an embodiment of the present invention relates to a system capable of providing more precise position information by learning various position-related data using a machine learning algorithm. Particularly, it may provide more precise position information by performing learning after analyzing various position-related data, prior to learning using a machine learning algorithm, and detecting objects corresponding to mark information including character information of buildings and the like, landmark information such as buildings, mountains, and the like of characteristic shapes, and environmental information such as rivers, lakes, forests, and the like included in the various position-related data, in other words, after generating learning data by classifying various items with comparatively little change and matching the items to the GPS information.

In addition, accuracy of various services based on augmented reality may be improved by applying the system for providing precise position information on the basis of machine learning.

For example, in the case of a message service based on augmented reality, it is a message service that allows communication and sharing feelings, when a user leaves a desired message at a desired place, by transmitting the message to be confirmed by unspecified many people passing through the place. At this point, in order to accurately determine the position of a specific place where the user desires to leave a message, which is most essential, accuracy of the position for leaving the message can be effectively improved by applying the system for providing precise position information on the basis of machine learning according to an embodiment of the present invention.

Particularly, the system and method for providing precise position information on the basis of machine learning according to an embodiment of the present invention has an advantage of precisely determining current position information using surrounding location information (surrounding picture data or the like), rather than simply determining precise position information using only GPS information.

Figure 1:
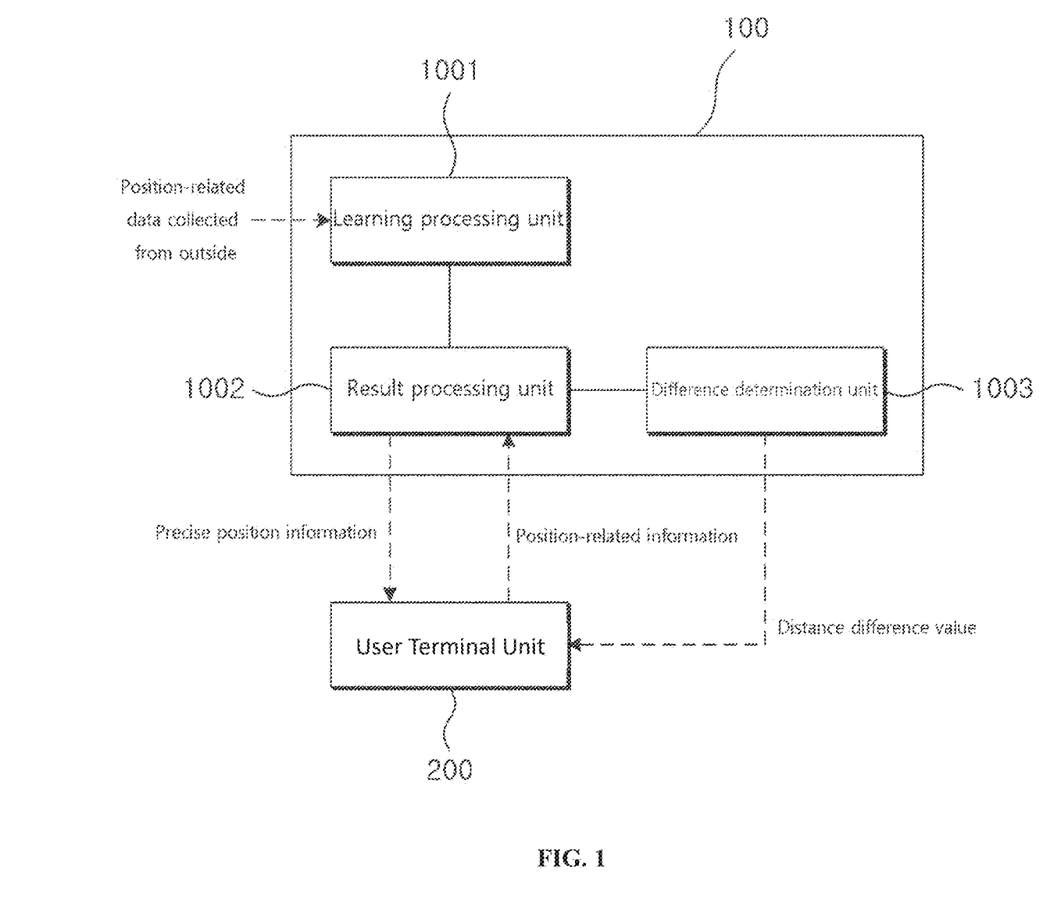
FIG. 1 is an exemplary view showing the configuration of a system for providing precise position information on the basis of machine learning according to an embodiment of the present invention.

FIG. 1 is a view showing the configuration of a system for providing precise position information on the basis of machine learning according to an embodiment of the present invention, and the system for providing precise position information on the basis of machine learning will be described in detail with reference to FIG. 1.

As shown in FIG. 1, a system for providing precise position information on the basis of machine learning according to an embodiment of the present invention is preferably configured to include an information providing unit 100 and a user terminal unit 200, and each of the components is configured in each operation processing means to perform an operation. That is, the information providing unit 100 is preferably a 'server for providing service' that receives position-related information of a desired position from the user terminal unit 200 and analyzes the information to provide precise position information, and the user terminal unit 200 is preferably a 'means for receiving service' through an application installed in advance.

At this point, the application installed in advance in the user terminal unit 200 is merely a basic step for receiving service.

Describing each component in detail, the information providing unit 100 preferably performs learning on the basis of machine learning to determine a precise position, determines the precise position using position-related information input from the user, i.e., from the user through the user terminal unit 200, and provides the determined precise position information to the user terminal unit 200.

Here, the 'server for providing service' (hereinafter, referred to as a "server") including the information providing unit 100 will be described in more detail.

Figure 2:
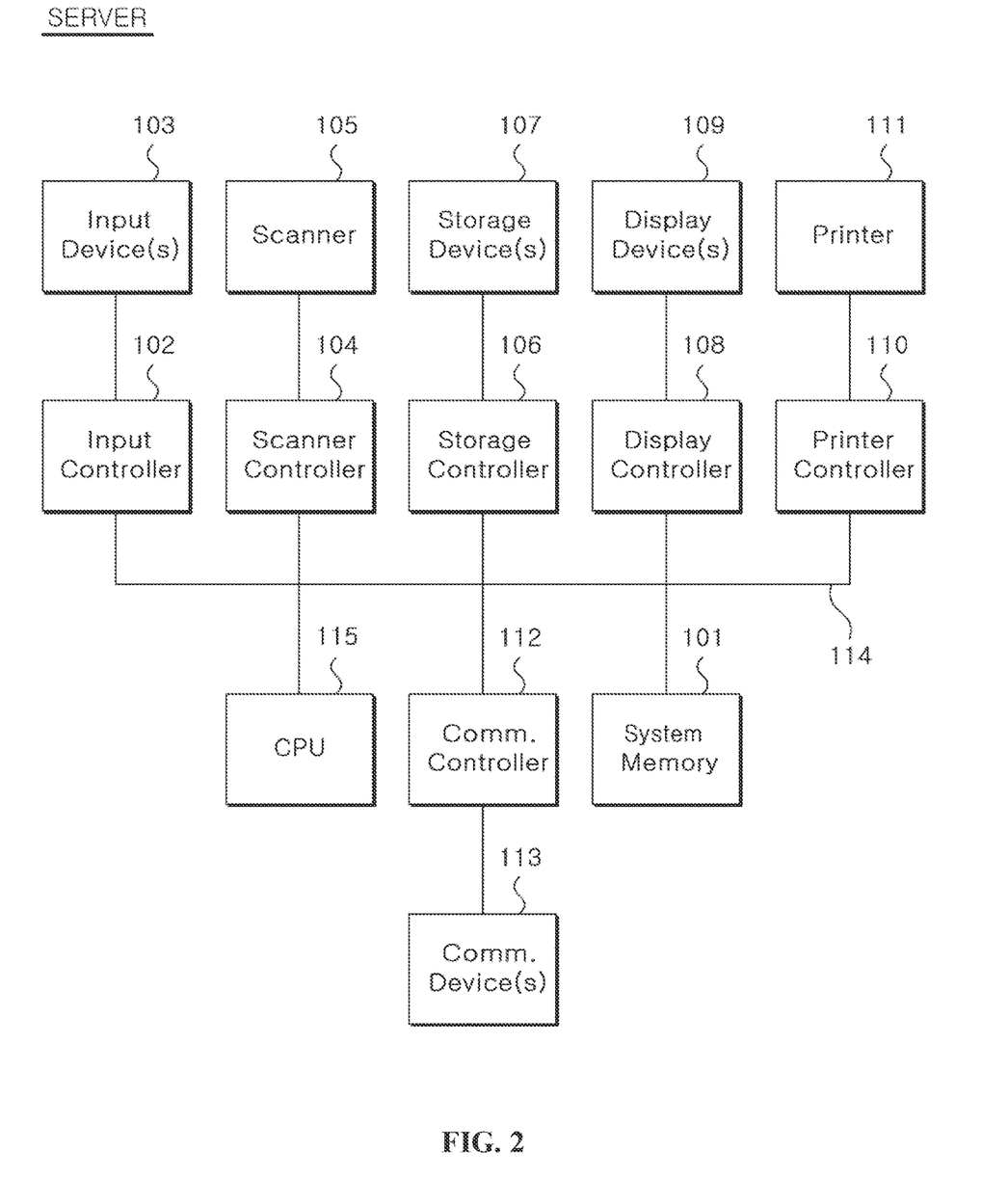
FIG. 2 is an exemplary view showing the configuration of a server according to an embodiment of the present invention.

FIG. 2 is an exemplary view showing the configuration of a server according to an embodiment of the present invention, and the configuration of a server according to an embodiment of the present invention will be described in detail with reference to FIG. 2.

It will be understood that the functionalities shown for the server may operate to support various embodiments of the electronic devices.

The server includes a central processing unit (CPU) 100 that provides computing resources and controls the computer. The CPU 100 may be implemented with a microprocessor or the like, and may also include a graphics processor and/or a floating-point coprocessor for mathematical computations. The CPU 100 includes all functions performed by the information providing unit 100. The CPU 100 may also include a system memory 101, which may be in the form of random-access memory (RAM) and read-only memory (ROM).

A number of controllers and peripheral devices may also be provided, as shown in FIG. 2. An input controller 102 represents an interface to various input device(s) 103, such as a keyboard, mouse, or stylus. There may also be a scanner controller 104, which communicates with a scanner 105. The server may also include a storage controller 106 for interfacing with one or more storage devices 107 each of which includes a storage medium such as magnetic tape or disk, or an optical medium that might be used to record programs of instructions for operating systems, utilities and applications which may include embodiments of programs that implement various aspects of the present invention. Storage device(s) 107 may also be used to store processed data or data to be processed in accordance with the invention. The server may also include a display controller 108 for providing an interface to a display device 109, which may be a cathode ray tube (CRT), a thin film transistor (TFT) display, or other type of display. The server may also include a printer controller 1001 for communicating with a printer 111. A communications controller 1014 may interface with one or more communication devices 1015, which enables the server to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the server illustrated in FIG. 2, all major system components may connect to a bus 114, which may represent more than one physical bus. However, various system components may or may not be in physical proximity to one another. For example, input data and/or output data may be remotely transmitted from one physical position to another. In addition, programs that implement various aspects of this invention may be accessed from a remote position (e.g., an external device) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

Meanwhile, the CPU 100, i.e., the information providing unit 100, may be divided into the components shown in FIG. 1. As shown in FIG. 1, the information providing unit 100 is preferably configured to include a learning processing unit 1001, a result processing unit 1002, and a difference determination unit 1003.

The learning processing unit 1001 preferably collects a plurality of position-related data from the outside, that is, collects a plurality of position-related picture data, drawing data, video data, building interior picture data, drawing data, building interior video data, weather information, and the like linked to GPS information and including time information from the outside, generates the plurality of collected position-related data as learning data for machine learning, and performs machine learning on the generated learning data.

Specifically, the learning processing unit 1001 preferably collects satellite pictures as the plurality of position-related picture data linked to the GPS information and including time information from the outside, and variously distributed road views, street views, open drawing data, video data, building interior picture data, drawing data, building interior video data, weather information, and the like as the video data, and generates learning data for machine learning. That is, it is preferable to generate the learning data for learning surrounding locations, surrounding structures, surrounding environments, and the like on the basis of the GPS information. At this point, the learning processing unit 1001 may generate the learning data by reflecting time information and weather information included in the position-related data. In addition, in the case of a building, data related to the internal structure may be collected using drawing data, picture data, video data, and the like of the building interior.

At this point, the learning processing unit 1001 preferably analyzes the plurality of collected position-related data, classifies at least one or more items among the text information, mark information, landmark information (buildings, ruins, etc.), and environment information (mountains, seas, rivers, lakes, etc.) included therein, i.e., detects item objects, and generates the learning data by matching the classified items to the GPS information.

After generating the learning data, the learning processing unit 1001 preferably performs learning on the learning data using a previously stored machine learning algorithm.

The result processing unit 1002 preferably receives, stores, and manages, using a learning model according to a result of the learning performed by the learning processing unit 1001, precise position information corresponding to the current position-related information or desired position-related information input from the user using the user terminal 200.

As the learning data generated by matching the items classified by the learning model to the GPS information has been learned, the precise position information generated by the result processing unit 1002 preferably includes the classified items included in the position-related information input from the user and the GPS information matching thereto.

At this point, the result processing unit 1002 may output different precise position information according to the position-related information input from the user using the user terminal unit 200. For example, when GPS information is received as the position-related information input from the user using the user terminal unit 200, the precise position information may be provided by detecting item objects located in the vicinity only on the basis of the input GPS information, and when picture data is received as the position-related information input from the user using the user terminal unit 200, the precise position information may be provided by detecting the included item objects only on the basis of the input picture data, and extracting items matching thereto. The output data according to the input data of the learning model will be described below in detail.

The result processing unit 1002 preferably stores and manages the precise position information through a three-dimensional database.

Since the items detected at each altitude may vary in some cases although the GPS information is the same, the precise position information is preferably stored and managed through a three-dimensional database.

In addition, there may be a problem in that the learning processing unit 1001 may not output the precise position information as the season or time zone is different from those of the position-related information input from the user due to the learning data generated by reflecting the time information and the weather information included in the position-related data.

For example, although learning about the noon and spring has been performed through the learning data generated by reflecting the time information and weather information included in the position-related data, when the position-related information input from the user is picture data of sunset or autumn thereafter, it could be difficult to accurately analyze the situation.

Therefore, the learning processing unit 1001 preferably analyzes the brightness value of light, whether or not snow is included, whether or not rain is included, items for recognizing a season (fallen leaves, snow, etc.), and the like included in the position-related information input from the user by performing a pre-correction process corresponding to the position-related information input from the user, and generates output data after performing additional corrections so that the learning model may take this into account.

Through this, the result processing unit 1002 preferably stores and manages the precise position information, together with additional correction conditions (corresponding time zone information, season information, etc.), through a three-dimensional database when the precise position information, which is the output data, is predicted.

The position (→ difference) determination unit 1003 preferably determines a distance difference value of a distance from the precise position information on the basis of the position-related information by comparing the precise position information stored and managed by the result processing unit 1002 with the position-related information input from the user, which is input data from which the precise position information is generated.

Through this, when there is an error in the GPS information included in the position-related information, the error may be corrected and used as distance information to a nearby position (item).

The information providing unit 100 preferably provides the precise position information stored and managed by the result processing unit 1002 or the distance difference value determined by the position (→ difference) determination unit 1003 to the user through the user terminal unit 200, and at this point, it is most preferable to provide the precise position information or the distance difference value through an application previously installed in the user terminal unit 200.

As described, the user terminal unit 200 inputting the position-related information for receiving the precise position information into the information providing unit 100 preferably inputs position-related information of a desired position using a previously installed application and receives precise position information corresponding to the position-related information.

The user terminal unit 200 is preferably configured to include a GPS, a camera, or both in order to input the position-related information into the information providing unit 100.

In some cases, when the current GPS information of a position desired by the user is input through an application previously installed in the user terminal unit 200, it is preferable to set the input current GPS information as the position-related information and transmit it to the information providing unit 100.

The information providing unit 100 preferably provides the precise position information or the distance difference value corresponding to the current GPS information to the user terminal unit 200 on the basis of the received current GPS information.

At this point, since only the current GPS information is input into the learning model, the surrounding locations, surrounding structures, surrounding environments, and the like are output as the precise position information on the basis of the GPS information matching the learning data, and a distance difference value determined according to each detected object is provided.

In addition, when surrounding picture data captured in real time using the camera at a position desired by the user is input through an application previously installed in the user terminal unit 200, it is preferable to set the input surrounding picture data as the position-related information and transmit the picture data to the information providing unit 100.

The information providing unit 100 extracts the precise position information matching the corresponding surrounding picture data and provides a distance difference value determined according to each detected object on the basis of the received surrounding picture data.

Although the surrounding locations, surrounding structures, surrounding environments, and the like may be predicted more clearly when the surrounding picture data is transmitted as the position-related information through the user terminal unit 200 as described above, compared with a case of transmitting only the GPS information, errors may also be generated in the case of a similar environment.

Therefore, when current GPS information of a position desired by the user is input together with the surrounding picture data through an application previously installed in the user terminal 200, it is preferable to set the input surrounding picture data and the current GPS information as the position-related information and transmit them to the information providing unit 100.

The information providing unit 100 extracts the precise position information matching the surrounding picture data on the basis of the GPS information, and provides a distance difference value determined according to each detected object, considering both the received surrounding picture data and current GPS information.

Although the information providing unit 100 receives current GPS information, surrounding picture data, or both from the user terminal unit 200, when it is difficult to predict the surrounding locations, surrounding structures, surrounding environments, and the like corresponding to the GPS information of one point, or the surrounding locations, surrounding structures, surrounding environments, and the like of two or more points are predicted, additional position-related information may be requested from the user terminal unit 200. Through this, there is an advantage of providing a more precisely corrected current position.

Figure 3:
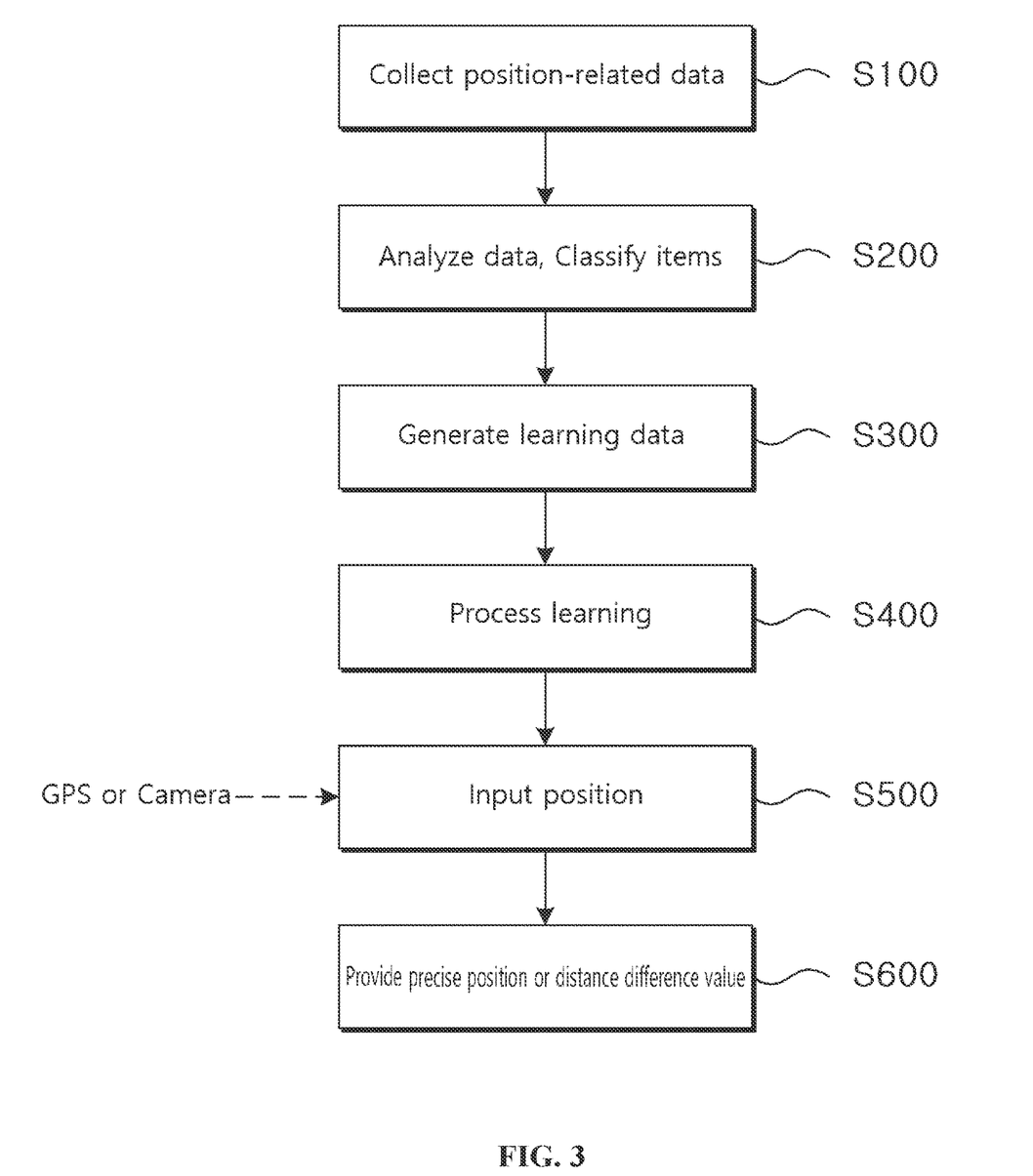
FIG. 3 is an exemplary flowchart illustrating a method of providing precise position information on the basis of machine learning according to an embodiment of the present invention.

FIG. 3 is an exemplary flowchart illustrating a method of providing precise position information on the basis of machine learning according to an embodiment of the present invention, and a method of providing precise position information based on machine learning according to an embodiment of the present invention will be described in detail with reference to FIG. 3.

As shown in FIG. 3, a method of providing precise position information on the basis of machine learning according to an embodiment of the present invention is preferably configured to include a data collection step (S100), a data analysis step (S200), a learning data generation step (S300), a learning processing step (S400), a position input step (S500), and a precise position providing step (S600).

Describing each of the steps in detail, at the data collection step (S100), the information providing unit 1001 preferably collects a plurality of position-related data from the outside, that is, collects a plurality of position-related picture data, drawing data, video data, building interior picture data, drawing data, building interior video data, weather information, and the like linked to GPS information and including time information from the outside.

For example, it is possible to collect satellite pictures as the plurality of position-related picture data linked to the GPS information and including time information from the outside, and variously distributed road views, street views, open drawing data, video data, building interior picture data, drawing data, building interior video data, weather information, and the like as the video data. In addition, in the case of a building, data related to the internal structure may be collected using drawing data, picture data, video data, and the like of the building interior.

At the data analysis step (S200), the information providing unit 100 preferably classifies preset items, i.e., objects, included in the position-related data collected at the data collection step (S100).

At the data analysis step (S200), it is preferable to analyze the position-related data collected at the data collection step (S100), and classify at least one or more items among the included text information, mark information, landmark information (buildings, ruins, etc.), and environment information (mountains, seas, rivers, lakes, etc.), i.e., detect item objects.

At the data analysis step (S200), the information providing unit 100 preferably generates the learning data by matching the classified items analyzed at the data analysis step (S200) to the GPS information, time information, and weather information. Through this, the learning data may be generated to learn the surrounding locations, surrounding structures, surrounding environments, and the like on the basis of the GPS information.

At the learning data generation step (S300), the information providing unit 100 preferably performs learning on the learning data generated at the learning data generation step (S300) using a previously stored machine learning algorithm.

At the learning processing step (S400), the user terminal unit 200 preferably inputs the position-related information using a previously installed application.

Specifically, the position input step (S500) is preferably configured to include a GPS, a camera, or both using a previously installed application in order to input the position-related information.

For example, at the position input step (S500), when the current GPS information of a position desired by the user is input through an application previously installed in the user terminal unit 200, it is preferable to set the input current GPS information as the position-related information and transmit it to the information providing unit 100.

As another example, at the position input step (S500), when surrounding picture data captured in real time using the camera at a position desired by the user is input through an application previously installed in the user terminal unit 200, it is preferable to set the input surrounding picture data as the position-related information and transmit the picture data to the information providing unit 100.

As still another example, at the position input step (S500), when current GPS information of a position desired by the user is input together with the surrounding picture data through an application previously installed in the user terminal 200, it is preferable to set the input surrounding picture data and the current GPS information as the position-related information and transmit them to the information providing unit 100.

At the precise position providing step (S600), it is preferable to generate precise position information corresponding to the position-related information by applying the position-related information input at the position input step (S500) to the learning model according to a result of learning at the learning processing step (S400), and provide the precise position information through an application of the user terminal unit 200.

In addition, at the precise position providing step (S600), a distance difference value of a distance from the precise position information may be determined and provided on the basis of the position-related information input at the position input step (S500), together with the generated precise position information.

Specifically, at the precise position providing step (S600), it is preferable to provide the precise position information or the distance difference value corresponding to the current GPS information to the user terminal unit 200 on the basis of the current GPS information received through the position input step (S500).

At this point, since only the current GPS information is input into the learning model, the surrounding locations, surrounding structures, surrounding environments, and the like are output as the precise position information on the basis of the GPS information matching the learning data, and a distance difference value determined according to each detected object is provided.

In addition, at the precise position providing step (S600), the precise position information matching the corresponding surrounding picture data is extracted, and a distance difference value determined according to each detected object is provided, on the basis of the surrounding picture data received through the position input step (S500).

Although the surrounding locations, surrounding structures, surrounding environments, and the like may be predicted more clearly when the surrounding picture data is set and transmitted as the position-related information as described above, compared with a case of transmitting only the GPS information, errors may also be generated in the case of a similar environment.

Therefore, at the precise position providing step (S600), the precise position information matching the surrounding picture data is extracted on the basis of the GPS information, and a distance difference value determined according to each detected object is provided, considering both the surrounding picture data and the current GPS information received through the position input step (S500).

As described above, as the learning data generated by matching object items classified from the position-related data by the learning model to GPS information has been learned, the precise position information, which is output data, preferably includes the classified object items included in the position-related information input from the user and the GPS information matching thereto.

At this point, there may be a problem in that precise position information may not be output later as the season or time zone is different from those of the position-related information input from the user since the time information and the weather information included in the position-related data are reflected when the learning data is generated through the learning data generation step (S300).

For example, although learning about the noon and spring has been performed through the learning data generated by reflecting the time information and weather information included in the position-related data, when the position-related information input from the user is picture data of sunset or autumn thereafter, it could be difficult to accurately analyze the situation.

Therefore, prior to applying the position-related information received through the position input step (S500) to the learning model, at the precise position providing step (S600), it is preferable to analyze the brightness value of light, whether or not snow is included, whether or not rain is included, items for recognizing the season (fallen leaves, snow, etc.), and the like included in the position-related information input from the user by performing a pre-correction process corresponding to the position-related information input from the user, and perform additional corrections so that the learning model may take this into account.

Although the present invention has been described above with specific details such as specific components and limited embodiment drawings, this is provided only to help a more general understanding of the present invention, and the present invention is not limited to the embodiment, and those skilled in the art may make various modifications and variations from these descriptions.

Therefore, the spirit of the present invention should not be limited to the described embodiments, and it will be construed that all modifications equal or equivalent to these claims, as well as the claims described below, belong to the scope of the present invention.

DESCRIPTION OF SYMBOLS

100: Information providing unit
1001: Learning processing unit
1002: Result processing unit
1003: Difference determination unit
200: User terminal

What is claimed is:

1. A system for providing precise position information on the basis of machine learning, the system comprising:
   a user terminal unit (200) configured to include a camera and a GPS to input surrounding picture data captured in real time and current GPS information as position-related information at a desired position through a previously installed application, and receive precise position information matching the position-related information; and
   an information providing unit (100) for performing learning on the basis of machine learning to determine a precise position, analyzing the position-related information input from the user terminal unit (200) and determining corresponding precise position information, and providing the determined precise position information to the user terminal unit (200), wherein
   the information providing unit (100) includes:
      a learning processing unit (1001) for collecting a plurality of position-related data including at least one piece of data among drawing data, video data, building interior picture data, building interior drawing data, building interior video data, time information, and weather information linked to the GPS information, together with picture data linked to the GPS information, generating the plurality of collected position-related data as learning data for machine learning, and performing learning on the generated learning data;
      a result processing unit (1002) for analyzing the position-related information input from the user terminal unit (200), determining the corresponding precise position information, and storing and managing the determined precise position information through a three-dimensional database, using a learning model according to a result of the learning performed by the learning processing unit (1001); and
      a difference determination unit (1003) for determining a distance difference value of a distance from the precise position information on the basis of the position-related information by comparing the precise position information stored and managed by the result processing unit (1002) with the position-related information input from the user terminal unit (200), wherein
         the information providing unit (100) provides the precise position information or the determined distance difference value to the user terminal unit (200), and the learning processing unit (1001) performs pre-correction on the surrounding picture data input from the user terminal unit (200) in consideration of the time information or the weather information included in the learning data, and the result processing unit (1002) determines the precise position information by analyzing the position-related information including the surrounding picture data pre-corrected by the learning processing unit (1001).

2. The system according to claim 1, wherein the learning processing unit (1001) analyzes the plurality of collected position-related data, classifies at least one or more items among text information, mark information, landmark information, and environment information included therein, and generates the learning data by matching the classified items to the GPS information.

3. The system according to claim 2, wherein the result processing unit (1002) configures the precise position information to include GPS information matching a classified item included in the position-related information.

4. A method of providing precise position information on the basis of machine learning, the method comprising:
   a data collection step (S100) of collecting a plurality of position-related data including at least one piece of data among drawing data, video data, building interior picture data, building interior drawing data, building interior video data, time information, and weather information linked to the GPS information, together with picture data linked to the GPS information, from outside by an information providing unit;
   a data analysis step (S200) of classifying preset items included in the position-related data collected at the data collection step (S100), by the information providing unit;
   a learning data generation step (S300) of generating learning data for machine learning by matching the classified items analyzed at the data analysis step (S200) to the GPS information, by the information providing unit;
   a learning processing step (S400) of performing learning on the learning data generated at the learning data generating step (S300), by the information providing unit;
   a position input step (S500) of inputting surrounding picture data captured in real time and current GPS information as position-related information at a desired position using a previously installed application, by a user terminal unit; and
   a precise position providing step (S600) of generating precise position information corresponding to the position-related information by applying the position-related information input at the position input step (S500) to a learning model according to a result of learning at the learning processing step (S400), and providing the precise position information through an application of a user terminal unit, and determining and providing a distance difference value of a distance from the precise position information on the basis of the position-related information input at the position input step (S500), together with the precise position information, by the information providing unit, wherein
      the information providing unit stores and manages the precise position information generated at the precise position providing step (S600) through a three-dimensional database, and at the precise position providing step (S600), pre-correction is performed on the surrounding picture data included in the input position-related information in consideration of the time information or the weather information included in the learning data, and the position-related information including the pre-corrected surrounding picture data is applied to the learning model.

5. The method according to claim 4, wherein at the data analysis step (S200), the plurality of collected position-related data is analyzed, and at least one or more items among text information, mark information, landmark information, and environment information included therein are classified.

* * * * *